(12) United States Patent
Kobaru et al.

(10) Patent No.: US 9,748,545 B2
(45) Date of Patent: Aug. 29, 2017

(54) PROPYLENE-BASED RESIN MICROPOROUS FILM, SEPARATOR FOR BATTERY, BATTERY, AND METHOD FOR PRODUCING PROPYLENE-BASED RESIN MICROPOROUS FILM

(71) Applicant: Sekisui Chemical Co., Ltd., Osaka (JP)

(72) Inventors: Shotaro Kobaru, Osaka (JP); Yuki Sakurai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 474 days.

(21) Appl. No.: 14/363,896

(22) PCT Filed: Dec. 7, 2012

(86) PCT No.: PCT/JP2012/081789
§ 371 (c)(1),
(2) Date: Jun. 9, 2014

(87) PCT Pub. No.: WO2013/089033
PCT Pub. Date: Jun. 20, 2013

(65) Prior Publication Data
US 2014/0335423 A1    Nov. 13, 2014

(30) Foreign Application Priority Data

Dec. 13, 2011 (JP) .................. 2011-272411
Dec. 13, 2011 (JP) .................. 2011-272414

(51) Int. Cl.
| | |
|---|---|
| H01M 2/16 | (2006.01) |
| H01M 2/14 | (2006.01) |
| B29C 47/00 | (2006.01) |
| B29C 71/02 | (2006.01) |
| C08J 5/18 | (2006.01) |
| B29L 31/34 | (2006.01) |
| B29K 23/00 | (2006.01) |

(52) U.S. Cl.
CPC ........ *H01M 2/1653* (2013.01); *B29C 47/0021* (2013.01); *B29C 47/0057* (2013.01); *B29C 71/02* (2013.01); *C08J 5/18* (2013.01); *H01M 2/145* (2013.01); *B29C 2071/022* (2013.01); *B29K 2023/12* (2013.01); *B29L 2031/3468* (2013.01); *C08J 2323/10* (2013.01)

(58) Field of Classification Search
CPC . H01M 2/1653; H01M 2/145; B29C 47/0057; B29C 47/0021; B29C 71/02; C08J 5/01; C08J 2323/10; B29L 2031/3468; B29K 2023/128
See application file for complete search history.

(56) References Cited

U.S. PATENT DOCUMENTS

| | | | |
|---|---|---|---|
| 2003/0031924 A1 | 2/2003 | Lee et al. | |
| 2009/0146334 A1* | 6/2009 | Takita | B01D 67/0027 264/41 |
| 2011/0269900 A1 | 11/2011 | Tamura et al. | |
| 2011/0294016 A1 | 12/2011 | Tamura et al. | |
| 2011/0311856 A1* | 12/2011 | Matsui | H01M 2/166 429/145 |
| 2013/0209892 A1* | 8/2013 | Ogawa | H01M 2/18 429/249 |
| 2013/0337311 A1 | 12/2013 | Itou | |

FOREIGN PATENT DOCUMENTS

| | | | |
|---|---|---|---|
| JP | 63-199742 | 8/1988 | |
| JP | 11-297297 | 10/1999 | |
| JP | 2000-63551 | 2/2000 | |
| JP | 2003-519723 | 6/2003 | |
| JP | WO 2010008003 A1 * | 1/2010 | ............ H01M 2/166 |
| JP | 2010-171005 | 8/2010 | |
| JP | 2011-246660 | 12/2011 | |
| JP | WO 2012023348 A1 * | 2/2012 | ........... B29C 55/005 |
| WO | 2007/046225 | 4/2007 | |
| WO | 2010/079784 | 7/2010 | |
| WO | 2010/079799 | 7/2010 | |
| WO | 2012/090632 | 7/2012 | |

OTHER PUBLICATIONS

International Search Report issued Feb. 19, 2013 in International (PCT) Application No. PCT/JP2012/081789.

* cited by examiner

*Primary Examiner* — Eugenia Wang
(74) *Attorney, Agent, or Firm* — Wenderoth, Lind & Ponack, L.L.P.

(57) ABSTRACT

The present invention provides a propylene-based resin microporous film which has excellent electrolyte solution retention property, and can provide a lithium ion battery in which a decrease in discharge capacity is highly reduced even after repeated charge and discharge. The propylene-based resin microporous film is a propylene-based resin microporous film having micropores, wherein a propylene-based resin having a weight average molecular weight of 250,000 to 500,000, a melting point of 160 to 170° C., and a pentad fraction of 96% or more is contained, the surface aperture ratio is 27 to 42%, the ratio of a surface aperture ratio to a porosity is 0.6 or less, and the degree of gas permeability is 50 to 400 s/100 mL.

5 Claims, No Drawings

PROPYLENE-BASED RESIN MICROPOROUS FILM, SEPARATOR FOR BATTERY, BATTERY, AND METHOD FOR PRODUCING PROPYLENE-BASED RESIN MICROPOROUS FILM

FIELD

The present invention relates to a propylene-based resin microporous film, a separator for a battery, a battery, and a method for producing a propylene-based resin microporous film.

BACKGROUND

A lithium ion battery has been conventionally used as a power supply for a portable electronic apparatus. The lithium ion battery is generally configured by disposing a positive electrode, a negative electrode, and a separator in an electrolyte solution. In the positive electrode, lithium cobaltate or lithium manganate is applied to the surface of an aluminum foil. In the negative electrode, carbon is applied to the surface of a copper foil. The separator is disposed so as to separate the positive electrode and the negative electrode, to prevent a short circuit between the positive electrode and the negative electrode.

When the lithium ion battery is charged, lithium ions are released from the positive electrode and move to the negative electrode. In contrast, when the lithium ion battery is discharged, lithium ions are released from the negative electrode and move to the positive electrode. Such charge and discharge are repeated in the lithium ion battery. Therefore, it is necessary that the separator used in the lithium ion battery can allow lithium ions to well permeate there.

Various polypropylene porous films having a high heat resistance have been proposed as the separator. For example, Patent Literature 1 has proposed a method for producing a polypropylene microporous film. The method includes melting and extruding a composition containing polypropylene, a polymer having a melt crystallization temperature higher than that of polypropylene, and a β-crystal nucleating agent into a sheet, and stretching the sheet at least uniaxially.

When the lithium ion battery is repeatedly charged and discharged, the electrolyte solution is subjected to reductive decomposition and oxidative decomposition in the negative electrode or the positive electrode. As a result, a portion where the electrolyte solution is not present is generated in an active material layer of the negative electrode or the positive electrode. Such a portion inhibits the diffusion of lithium ions, and therefore the discharge capacity of the lithium ion battery rapidly decreases. Such a phenomenon is generally called a "liquid shortage."

Therefore, it is desired to improve electrolyte solution retention property of a polypropylene microporous film, in order to store a sufficient amount of electrolyte solution in a battery and to reduce the occurrence of liquid shortage phenomenon.

However, the polypropylene microporous film obtained by the method of Patent Literature 1 has the low electrolyte solution retention property and cannot sufficiently reduce a decrease in discharge capacity caused by liquid shortage of the lithium ion battery.

CITATION LIST

Patent Literature

Patent Literature 1: Japanese Patent Application Laid-Open No. Sho. 63-199742

SUMMARY

Technical Problem

The present invention provides a propylene-based resin microporous film which has excellent electrolyte solution retention property, and is capable of providing a lithium ion battery in which a decrease in discharge capacity is highly reduced even when charge and discharge are repeated. It is another object of the invention to provide a method for producing the same. Further, the present invention provides a separator for a battery comprising the above propylene-based resin microporous film, and a battery using the same.

Means for Solving Problem

The propylene-based resin microporous film of the present invention is a propylene-based resin microporous film having micropores, wherein a propylene-based resin having a weight average molecular weight of 250,000 to 500,000, a melting point of 160 to 170° C., and a pentad fraction of 96% or more is contained, the surface aperture ratio is 27 to 42%, the ratio of a surface aperture ratio to a porosity is 0.6 or less, and the degree of gas permeability is 50 to 400 s/100 mL.

Examples of the propylene-based resin used for the propylene-based resin microporous film may include a propylene homopolymer and a copolymer of propylene and another olefin. The propylene-based resin may be used alone or in combination of two or more kinds thereof. The copolymer of propylene and another olefin may be any of a block copolymer and a random copolymer.

It is preferable that the propylene-based resin be a propylene homopolymer.

Examples of olefins copolymerizable with propylene may include α-olefins such as ethylene, 1-butene, 1-pentene, 4-methyl-1-pentene, 1-hexene, 1-octene, 1-nonene, and 1-decene.

The weight average molecular weight of the propylene-based resin is limited to 250,000 to 500,000, and preferably 280,000 to 480,000. When the weight average molecular weight of the propylene-based resin is low, the micropores may be non-uniformly formed in the propylene-based resin microporous film. In contrast, when the weight average molecular weight of the propylene-based resin is high, the formation of the propylene-based resin microporous film may be unstable, and the micropores may not be easily formed in the propylene-based resin microporous film.

The molecular weight distribution (weight average molecular weight Mw/number average molecular weight Mn) of the propylene-based resin is preferably 7.5 to 12.0, more preferably 8.0 to 11.5, and particularly preferably 8.0 to 11.0. When the molecular weight distribution of the propylene-based resin is narrow, the surface aperture ratio of the propylene-based resin microporous film may deteriorate. In contrast, when the molecular weight distribution of the propylene-based resin is wide, the mechanical strength of the propylene-based resin microporous film may deteriorate.

Here, the weight average molecular weight and the number average molecular weight of the propylene-based resin are values measured by a gel permeation chromatography (GPC) using polystyrene as a standard. Specifically, 6 to 7 mg of propylene-based resin is weighed, and placed in a test tube. An o-dichlorobenzene (o-DCB) solution containing 0.05% by weight of dibutyl hydroxy toluene (BHT) is added to the test tube to dilute the propylene-based resin to a concentration of 1 mg/mL. Thus, a diluted solution is prepared.

The diluted solution is shaken using a device for dissolution and filtration at 145° C. and a revolution speed of 25 rpm over 1 hour to dissolve the propylene-based resin in the o-DCB solution containing BHT. The solution is used as a sample for measurement. The weight average molecular weight and the number average molecular weight of the propylene-based resin can be measured by GPC using the sample for measurement.

The weight average molecular weight and the number average molecular weight of the propylene-based resin can be measured, for example, by the following measurement device under the following measurement conditions.
<Measurement Device>
Trade name "HLC-8121GPC/HT" manufactured by TOSOH Corporation
<Measurement Conditions>
Column: TSKgelGMHHR-H(20)HT×3
 TSKguardcolumn-HHR(30)HT×1
Mobile phase: o-DCB 1.0 mL/min
Sample concentration: 1 mg/mL
Detector: Blythe type refractometer
Standard substance: polystyrene (available from TOSOH Corporation, molecular weight: 500 to 8,420,000)
Elution condition: 145° C.
SEC temperature: 145° C.

The melting point of the propylene-based resin is limited to 160 to 170° C., and preferably 160 to 165° C. When the melting point of the propylene-based resin is low, the mechanical strength of the propylene-based resin microporous film at high temperatures may deteriorate. In contrast, when the melting point of the propylene-based resin is high, the formation of the propylene-based resin microporous film may be unstable.

The pentad fraction of the propylene-based resin is limited to 96% or more, and preferably 96 to 98%. When the pentad fraction of the propylene-based resin is less than 96%, lamellae cannot be sufficiently grown in a propylene-based resin film. Even when such a propylene-based resin film is stretched, the micropores are unlikely to be formed. Further, the porosity of the propylene-based resin microporous film to be obtained deteriorates. Therefore, the ratio of the surface aperture ratio to the porosity in the propylene-based resin microporous film increases, and the solution retention property deteriorates.

Herein, the pentad fraction of the propylene-based resin represents a ratio of five consecutive propylene monomer units having the same steric configuration in the propylene-based resin of which the amount is determined on the basis of assignment of peak of $^{13}$C-nuclear magnetic resonance spectrum. The pentad fraction of the propylene-based resin can be measured in accordance with a method described in "Macromolecules" (1980, vol. 13, p. 267) disclosed by A. Zambelli et al.

The surface aperture ratio of the propylene-based resin microporous film is limited to 27 to 42%, and preferably 30 to 40%. When the surface aperture ratio of the propylene-based resin microporous film is less than 27%, the micropores are unlikely to be filled with an electrolyte solution, and therefore the solution retention property deteriorates. In addition, excess time may be required to fill the micropores with the electrolyte solution during a battery assembly process. When the surface aperture ratio of the propylene-based resin microporous film is more than 42%, the electrolyte solution filled in the micropores easily flows outward, and a sufficient amount of electrolyte solution cannot be retained. Therefore, the solution retention property may deteriorate.

The surface aperture ratio of the propylene-based resin microporous film can be measured as follows. A measurement part of planar rectangular shape with a width of 9.6 μm and a length of 12.8 μm is first determined in any part of the surface of the propylene-based resin microporous film, and photographed at a magnification of 10,000.

Each micropore formed in the measurement part is then surrounded by a rectangle. The rectangle is adjusted so that both the long and short sides are the shortest. The area of the rectangle is considered as the aperture area of each micropore. The total aperture area S ($\mu m^2$) of the micropores is calculated by adding the aperture area of each micropore together. The total aperture area S ($\mu m^2$) of the micropores is divided by 122.88 $\mu m^2$ (9.6 μm×12.8 μm) and then multiplied by 100 to calculate a surface aperture ratio (%). For a micropore that exists over a measurement part and a non-measurement part, only a part of the micropore that exists within the measurement part is considered as a subject to be measured.

In the propylene-based resin microporous film, the ratio (A/P) of the surface aperture ratio (A) to the porosity (P) is limited to 0.6 or less.

In the present invention, the "surface aperture ratio" means a ratio of the total aperture area of micropores in the surface of the propylene-based resin microporous film per unit area. The "porosity" means a ratio of the total volume of micropores in the propylene-based resin microporous film per unit volume. The "surface aperture ratio" and the "porosity" are different since the respective standards are different in terms of area and volume, but are the same since they means the occupied ratio of micropores in a certain range. When cylindrical micropores which penetrate through the propylene-based resin microporous film in a thickness direction of the propylene-based resin microporous film, that is, in a direction vertical to the front surface of the propylene-based resin microporous film are formed, the porosity of the propylene-based resin microporous film having such micropores is the same as the surface aperture ratio.

When the surface aperture ratio of the propylene-based resin microporous film is higher than the porosity, it can be said that the propylene-based resin microporous film includes micropores having a structure in which the aperture area in the film surface is large and the volume in the film is small. In contrast, when the surface aperture ratio of the propylene-based resin microporous film is lower than the porosity, it can be said that the propylene-based resin microporous film includes micropores having a structure in which the aperture area in the film surface is small and the volume in the film is large.

In the propylene-based resin microporous film of the present invention, the ratio (A/P) of the surface aperture ratio (A) to the porosity (P) is limited to 0.6 or less. Therefore, it can be said that the micropores present in the propylene-based resin microporous film have a structure in which the aperture area in the film surface is small and the volume in the film is large. According to the micropores having such a structure, an electrolyte solution in the micropores cannot be allowed to flow out of the film and can be retained. Therefore, excellent solution retention property can be imparted to the propylene-based resin microporous film.

On the other hand, when the ratio (A/P) of the surface aperture ratio (A) to the porosity (P) of the propylene-based resin microporous film is too low, excess time is required to sufficiently fill the micropores with an electrolyte solution. Therefore, the productivity of a battery may deteriorate.

Accordingly, the ratio (A/P) of the surface aperture ratio (A) to the porosity (P) is preferably 0.5 to 0.6, and more preferably 0.5 to 0.55.

The porosity of the propylene-based resin microporous film is preferably 45 to 70%, more preferably 50 to 67%, and particularly preferably 54 to 67%. When the porosity of the propylene-based resin microporous film is too low, the solution retention property may not be sufficient. In contrast, when the porosity of the propylene-based resin microporous film is too high, the mechanical strength may deteriorate.

The porosity of the propylene-based resin microporous film can be measured as follows. The propylene-based resin microporous film is first cut to obtain a specimen having a plane square with a length of 10 cm and a width of 10 cm (area: 100 cm$^2$). The weight W (g) and the thickness T (cm) of the specimen are then measured, and the apparent density $\rho$ (g/cm$^3$) is calculated using the following equation (1). Further, the thickness of the specimen is measured at 15 portions using a dial gauge (for example, Signal ABS Digimatic Indicator manufactured by Mitutoyo Corporation), and the arithmetic average thereof is calculated as the thickness of the specimen. The porosity P(%) of the propylene-based resin microporous film can be calculated from the apparent density $\rho$ (g/cm$^3$) and the density $\rho_0$ (g/cm$^3$) of the propylene-based resin itself using the following equation (2).

Apparent density $\rho$ (g/cm$^3$)=$W/(100\times T)$ (1)

Porosity $P(\%)=100\times[(\rho_0-\rho)/\rho_0]$ (2)

The degree of gas permeability of the propylene-based resin microporous film is limited to 50 to 400 s/100 mL, preferably 50 to 200 s/100 mL, and more preferably 50 to 150 s/100 mL. When the degree of gas permeability of the propylene-based resin microporous film falls within the above-described range, a ratio of gas that passes through the propylene-based resin microporous film is high. Accordingly, the propylene-based resin microporous film has micropores penetrating in the thickness direction thereof. In such a propylene-based resin microporous film, many micropores can be filled with an electrolyte solution, and a large amount of electrolyte solution can be retained.

When a propylene-based resin microporous film having micropores is formed by uniaxially stretching a propylene-based resin film, the degree of gas permeability of the propylene-based resin microporous film is preferably 100 to 400 s/100 mL, more preferably 100 to 320 s/100 mL, and particularly preferably 100 to 180 s/100 mL.

When a propylene-based resin microporous film having micropores is formed by biaxially stretching a propylene-based resin film, the degree of gas permeability of the propylene-based resin microporous film is preferably 50 to 200 s/100 mL, more preferably 50 to 180 s/100 mL, and particularly preferably 50 to 150 s/100 mL.

The degree of gas permeability of the propylene-based resin microporous film is a value measured at 23° C. and a relative humidity of 65% in accordance with JIS P8117.

The aperture edges of the micropores in the propylene-based resin microporous film preferably have the longest diameter of 100 nm to 1 µm and the average longer diameter of 10 to 500 nm, and more preferably have the longest diameter of 100 nm to 900 nm and the average longer diameter of 10 nm to 400 nm. When the longest diameter and the average longer diameter of the aperture edges of the micropores in the propylene-based resin microporous film fall within the above-described ranges, the absorbability of electrolyte solution due to capillary phenomenon is excellent. Therefore, a larger amount of electrolyte solution can be retained in the micropores.

The longest diameter and average longer diameter of the aperture edges of the micropores in the propylene-based resin microporous film are measured as follows. The surface of the propylene-based resin microporous film is first carbon-coated. Any ten portions in the surface of the propylene-based resin microporous film are photographed by a scanning electron microscope at a magnification of 10,000. A photographed region is a region of planar rectangular shape with a width of 9.6 µm and a length of 12.8 µm in the surface of the propylene-based resin microporous film.

The longer diameter of the aperture edge of each of the micropores in the photograph is measured. Of the longer diameters of the aperture edges of the micropores, the longest diameter is defined as a longest diameter of the aperture edges of the micropores. The arithmetic average of the longer diameters of the aperture edges of the micropores is defined as an average longer diameter of the aperture edges of the micropores. The longer diameter of the aperture edge of each of the micropores is a diameter of a perfect circle with the shortest diameter in which the aperture edge of the micropore can be surrounded. A micropore that exists over the photographing region and a non-photographing region is excluded from the subject to be measured.

The propylene-based resin microporous film of the present invention has excellent solution retention property, and thus, a larger amount of electrolyte solution can be retained therein. Specifically, the electrolyte solution retention amount of the propylene-based resin microporous film of the present invention is preferably 0.90 g/cm$^3$ or more, and more preferably 0.90 to 1.5 g/cm$^3$. The propylene-based resin microporous film can provide a lithium ion battery which can contain a sufficient amount of electrolyte solution and in which a decrease in discharge capacity is highly reduced even when charge and discharge are repeated.

In the present invention, the electrolyte solution retention amount of the propylene-based resin microporous film can be measured as follows. The propylene-based resin microporous film is first cut to obtain a specimen having a plane square with a length of 5 cm and a width of 5 cm. The area (25 cm$^2$) of the specimen is multiplied by the thickness (cm) to calculate the volume V (cm$^3$) of the specimen. Further, the thickness of the specimen is measured at 15 portions using a dial gauge (for example, Signal ABS Digimatic Indicator manufactured by Mitutoyo Corporation), and the arithmetic average thereof is calculated as the thickness of the specimen. Next, the weight $W_1$ (g) of the specimen is measured. The specimen is immersed in the electrolyte solution for 1 hour. The specimen is taken out from the electrolyte solution, and allowed to stand for 10 minutes while suspended, and then the weight $W_2$ (g) of the specimen is measured. Note that the electrolyte solution is prepared by dissolving LiPF$_6$ at a concentration of 1 mol/L in an organic solvent containing ethylene carbonate (EC) and diethyl carbonate (DEC) (EC:DEC (by volume)=1:1). After that, the electrolyte solution retention amount of the specimen is calculated using the following equation. By the same procedure as described above, five specimens are prepared from the propylene-based resin microporous film. The electrolyte solution retention amount of each specimen is calculated, and the arithmetic average thereof is defined as an electrolyte solution retention amount of the propylene-based resin microporous film.

Electrolyte solution retention amount $(g/cm^3) = [W_2 (g) - W_1 (g)]/V (cm^3)$

Since the propylene-based resin microporous film of the present invention has excellent solution retention property, it is useful as a separator for a battery. In addition to the lithium ion battery, examples of the battery in which the propylene-based resin microporous film of the present invention can be used as a separator may include a nickel-hydrogen battery, a nickel-cadmium battery, a nickel-zinc battery, and a silver-zinc battery. Among them, the lithium ion battery is preferred.

Next, a method for producing a propylene-based resin microporous film of the present invention will be described. The propylene-based resin microporous film of the present invention can be produced by a method including:

an extrusion step of supplying a propylene-based resin having a weight average molecular weight of 250,000 to 500,000, a melting point of 160 to 170° C., a pentad fraction of 96% or more to an extruder, melt-kneading the propylene-based resin, and extruding the propylene-based resin through a T die attached to the tip of the extruder to obtain a propylene-based resin film;

an aging step of aging the propylene-based resin film obtained in the extrusion step for 1 minute or longer at a temperature equal to or higher than a temperature lower than the melting point of the propylene-based resin by 30° C. and equal to or lower than a temperature lower than the melting point of the propylene-based resin by 1° C.;

a first stretching step of stretching the propylene-based resin film after the aging step; and a first annealing step of annealing the propylene-based resin film after the first stretching step. Hereinafter, the method for producing the propylene-based resin microporous film of the present invention will be described in due order.

[Extrusion Step]

In the extrusion step, a propylene-based resin is first supplied to an extruder, melt-kneaded, and extruded through a T die attached to the tip of the extruder to obtain a propylene-based resin film.

The temperature of the propylene-based resin during melt-kneading the propylene-based resin in the extruder is preferably equal to or higher than a temperature higher than the melting point of the propylene-based resin by 20° C. and equal to or lower than a temperature higher than the melting point of the propylene-based resin by 100° C., and more preferably equal to or higher than a temperature higher than the melting point of the propylene-based resin by 25° C. and equal to or lower than a temperature higher than the melting point of the propylene-based resin by 80° C. When the temperature of the propylene-based resin is low, the thickness of the obtained propylene-based resin microporous film may not be made uniform. When the temperature of the propylene-based resin is high, the orientation of the propylene-based resin may deteriorate, resulting in no formation of lamellae in the propylene-based resin.

The draw ratio during extrusion of the propylene-based resin, through the extruder into a film is preferably 50 to 300, more preferably 65 to 250, and particularly preferably 70 to 250. When the draw ratio is low, a tension applied to the propylene-based resin decreases, and the molecular orientation of the propylene-based resin is insufficient. Thus, lamellae may not be sufficiently formed in the propylene-based resin. When the draw ratio is high, the film-forming stability of the propylene-based resin film deteriorates. Further, the uniformity of thickness and width of the obtained propylene-based resin film may deteriorate.

The draw ratio is a value obtained by dividing the clearance of a lip of a T die by the thickness of the propylene-based resin film extruded through the T die. The clearance of the lip of the T die can be measured as follows. The clearance of the lip of the T die is measured at 10 or more portions using a feeler gauge (for example, JIS feeler gauge manufactured by NAGAI GAUGES) in accordance with JIS B7524, and the arithmetic average thereof is calculated. Further, the thickness of the propylene-based resin film extruded through the T die can be measured as follows. The thickness of the propylene-based resin film extruded through the T die is measured at 10 or more portions using a dial gauge (for example, Signal ABS Digimatic Indicator manufactured by Mitutoyo Corporation), and the arithmetic average thereof is calculated.

The film-forming rate of the propylene-based resin film is preferably 10 to 300 m/min, more preferably 15 to 250 m/min, and particularly preferably 15 to 30 m/min. When the film-forming rate of the propylene-based resin film is low, a tension applied to the propylene-based resin decreases, and the molecular orientation of the propylene-based resin is insufficient. Thus, lamellae may not be sufficiently formed in the propylene-based resin. In contrast, when the film-forming rate of the propylene-based resin film is high, the molecular orientation of the propylene-based resin is high, but the film-forming stability of the propylene-based resin film deteriorates. Therefore, the thickness precision and the width precision of the obtained propylene-based resin film may deteriorate.

It is preferable that the propylene-based resin film extruded through the T die be cooled until the surface temperature thereof is equal to or lower than a temperature lower than the melting point of the propylene-based resin by 100° C. By cooling in this manner, the propylene-based resin constituting the propylene-based resin film can be crystallized to form lamellae. The melt-kneaded propylene-based resin is extruded to orient the molecules of the propylene-based resin constituting the propylene-based resin film in advance. After that, the propylene-based resin film is cooled. A portion where the propylene-based resin is oriented can promote the formation of lamellae. Further, a lamellar structure in which crystallized portions (lamellae) and uncrystallized portions are arranged alternately in the extrusion direction of the propylene-based resin film can be formed.

The surface temperature of the cooled propylene-based resin film is preferably equal to or lower than a temperature lower than the melting point of the propylene-based resin by 100° C., more preferably a temperature that is lower than the melting point of the propylene-based resin by 140 to 110° C., and particularly preferably a temperature that is lower than the melting point of the propylene-based resin by 135 to 120° C. When the surface temperature of the cooled propylene-based resin film is high, the propylene-based resin constituting the propylene-based resin film may not be sufficiently crystallized, and thus lamellae may not be formed.

[Aging Step]

Subsequently, the aging step of aging the propylene-based resin film obtained in the extrusion step is performed. The aging step of the propylene-based resin is performed to grow lamellae formed in the propylene-based resin film in the extrusion step. In the stretching step of the propylene-based resin film as described below, a crack is generated between the lamellae but not within the lamellae. Starting from the crack, a micro through pore (micropore) can be formed. Further, in the aging step, the thickness of the lamellae can be increased in the thickness direction of the propylene-based resin film. Stretching such a propylene-based resin film can form a micropore which penetrates the propylene-based resin film in the thickness direction.

The aging temperature of the propylene-based resin film is limited to a temperature that is equal to or higher than a temperature lower than the melting point of the propylene-based resin by 30° C. and equal to or lower than a temperature lower than the melting point of the propylene-based resin by 1° C., preferably a temperature that is equal to or higher than a temperature lower than the melting point of the propylene-based resin by 30° C. and equal to or lower than a temperature lower than the melting point of the propylene-based resin by 5° C., and more preferably a temperature that is equal to or higher than a temperature lower the melting point of the propylene-based resin by 25° C. and equal to or lower than a temperature lower than the melting point of the propylene-based resin by 10° C. When the aging temperature is low, the crystallization of lamellae cannot be sufficiently promoted. Therefore, in the stretching step of the propylene-based resin film, a micro through pore is unlikely to be formed between the lamellae. When the aging temperature is high, the molecular orientation of the propylene-based resin is relaxed, and a lamellar structure may be broken.

The aging temperature of the propylene-based resin film is the surface temperature of the propylene-based resin film. However, when the surface temperature of the propylene-based resin film cannot be measured, a temperature under an atmosphere where the propylene-based resin film is present is used as the aging temperature of the propylene-based resin film. In this case, for example, the propylene-based resin film is wound into a roll and then aged as it is. Specifically, when the propylene-based resin film is wound into a roll and then aged in a heating device such as a hot blast furnace, the temperature in the heating device is defined as the aging temperature.

The aging time of the propylene-based resin film is limited to 1 minute or longer. When the aging time of the propylene-based resin film is short, lamellae may not be sufficiently grown.

The propylene-based resin film may be aged while the propylene-based resin film is allowed to travel or after the propylene-based resin film is wound into a roll. In particular, it is preferable that the propylene-based resin film is wound into a roll and then aged as it is.

When the propylene-based resin film is aged while the propylene-based resin film is allowed to travel, it is necessary that the traveling be performed with a certain tension applied to the propylene-based resin film in a traveling direction to prevent the propylene-based resin film from sagging. When the propylene-based resin film is aged while it is allowed to travel as described above, the propylene-based resin film is elongated by the tension applied to the propylene-based resin film. As a result, the lamellae formed in the propylene-based resin film in the extrusion step may be broken. Thus, the growth of the lamellae may not be sufficiently promoted. In contrast, when the propylene-based resin film is wound into a roll and then aged as it is, an excess tension is not applied to the propylene-based resin film. This highly suppresses breakage of the lamellae formed in the propylene-based resin film in the extrusion step, and allows the lamellae in the propylene-based resin film to grow sufficiently. After aging, the propylene-based resin film may be unwound from the wound roll of the propylene-based resin film and be subjected to the first stretching step.

When the propylene-based resin film is aged while the propylene-based resin film is allowed to travel, the aging time of the propylene-based resin film is limited to 1 minute or longer, and preferably 5 minutes to 60 minutes.

When the propylene-based resin film is wound into a roll and then aged as it is, the aging time is preferably 10 minutes or longer, more preferably 1 hour or longer, and particularly preferably 15 hours or longer. When the propylene-based resin film wound up into a roll is aged for such an aging time, the propylene-based resin film can be sufficiently aged while the temperatures of the propylene-based resin film from the surface to the inside of the roll are entirely maintained at the above-described aging temperature. Thus, crystallization of lamellae in the propylene-based resin film can be sufficiently promoted. When the aging time is too long, the crystallization of lamellae in the propylene-based resin film corresponding to an increase in the aging time may not be expected. In addition, the propylene-based resin film may be thermally degraded. Therefore, the aging time is preferably 35 hours or shorter, and more preferably 30 hours or shorter.

[First Stretching Step]

Next, the propylene-based resin film after the aging step is stretched in the first stretching step. In the first stretching step, the propylene-based resin film is stretched preferably only in the extrusion direction. Thus, in the first stretching step, the lamellae in the propylene-based resin film are separated from each other by stretching the propylene-based resin film. As a result, fine cracks are independently generated in an uncrystallized portion between the lamellae. Starting from the cracks, many micropores that penetrate the propylene-based resin film in the thickness direction are formed.

The first stretching step preferably includes:

a first stretching step (A) of stretching the propylene-based resin film after the aging step at a surface temperature of −20 to 100° C. and a stretching ratio of 1.05 to 1.60 times in the extrusion direction; and a first stretching step (B) of stretching the propylene-based resin film stretched in the first stretching step (A) at a surface temperature higher than the surface temperature of the propylene-based resin film in the first stretching step (A) and equal to or lower than a temperature lower than the melting point of the propylene-based resin by 10 to 100° C., and a stretching ratio of 1.05 to 3 times in the extrusion direction.

(First Stretching Step (A))

In the first stretching step (A), the propylene-based resin film after the aging step is stretched at a surface temperature of −20 to 100° C. and a stretching ratio of 1.05 to 1.60 times in the extrusion direction. In the first stretching step (A), lamellae in the propylene-based resin film are hardly molten. The lamellae are separated from each other by stretching the propylene-based resin film. Thus, many micropores can be formed.

The surface temperature of the propylene-based resin film in the first stretching step (A) is preferably −20 to 100° C., and more preferably 0 to 80° C. When the surface temperature is low, the propylene-based resin film may be ruptured during stretching. When the surface temperature is high, a crack is unlikely to be generated in the uncrystallized portion.

The stretching ratio of the propylene-based resin film in the first stretching step (A) is preferably 1.05 to 1.60 times, and more preferably 1.10 to 1.50 times. When the stretching ratio is low, the micropores are unlikely to be formed in the uncrystallized portion. When the stretching ratio is high, the micropores may not be uniformly formed in the propylene-based resin microporous film.

In the present invention, the stretching ratio of the propylene-based resin film is a value obtained by dividing the length of a propylene-based resin film after stretching by the length of the propylene-based resin film before stretching.

The stretching rate of the propylene-based resin film in the first stretching step (A) is preferably 20%/min or more. When the stretching rate is low, the micropores are unlikely to be uniformly formed in the uncrystallized portion. When the stretching rate is too high, the propylene-based resin film may be ruptured. Therefore, the stretching rate of the propylene-based resin film in the first stretching step (A) is more preferably 20 to 3,000%/min, and particularly preferably 20 to 70%/min.

In the present invention, the stretching rate of the propylene-based resin film is a rate of change in the dimension of the propylene-based resin film in the stretching direction thereof per unit time.

A method of stretching a propylene-based resin film in the first stretching step (A) is not particularly limited as long as the propylene-based resin film can be stretched. Examples thereof may include a method of uniaxially stretching a propylene-based resin film at a predetermined temperature using a uniaxial stretching device.

(First Stretching Step (B))

Next, the first stretching step (B) is performed as follows. The propylene-based resin film after the first stretching step (A) is stretched at a surface temperature that is higher than the surface temperature of the propylene-based resin film in the first stretching step (A) and equal to or lower than a temperature lower than the melting point of the propylene-based resin by 10 to 100° C., and a stretching ratio of 1.05 to 3 times in the extrusion direction. As described above, in the first stretching step (B), the propylene-based resin film is stretched in the same direction as in the first stretching step (A) at a surface temperature higher than that of the propylene-based resin film in the first stretching step (A). Thus, many micropores formed in the propylene-based resin film in the first stretching step (A) can be grown in the extrusion direction of the propylene-based resin film.

In the first stretching step (B), the surface temperature of the propylene-based resin film is preferably higher than the surface temperature of the propylene-based resin film in the first stretching step (A) and equal to or lower than a temperature lower than the melting point of the propylene-based resin by 10 to 100° C., and more preferably higher than the surface temperature of the propylene-based resin film in the first stretching step (A) and equal to or lower than a temperature lower than the melting point of the propylene-based resin by 15 to 80° C. When the surface temperature is low, the micropores formed in the propylene-based resin film in the first stretching step (A) are difficult to be grown, and the gas permeability of the propylene-based resin microporous film may not be improved. When the surface temperature is high, the micropores formed in the propylene-based resin film in the first stretching step (A) are blocked, and the gas permeability of the propylene-based resin microporous film may deteriorate.

In the first stretching step (B), the stretching ratio of the propylene-based resin film is preferably 1.05 to 3 times, and more preferably 1.8 to 2.5 times. When the stretching ratio is low, the micropores formed in the first stretching step (A) are unlikely to be grown. When the stretching ratio is high, the micropores formed in the propylene-based resin film in the first stretching step (A) are blocked, and the gas permeability of the propylene-based resin microporous film may deteriorate.

In the first stretching step (B), the stretching rate of the propylene-based resin film is preferably 500%/min or less, more preferably 400%/min or less, and particularly preferably 60%/min or less. When the stretching rate is high, the micropores may not be uniformly formed in the propylene-based resin film. When the stretching rate is low, the micropores are unlikely to be uniformly formed in the uncrystallized portion between the lamellae. Therefore, the stretching rate of the propylene-based resin film in the first stretching step (B) is preferably 15%/min or more.

A method of stretching a propylene-based resin film in the first stretching step (B) is not particularly limited as long as the propylene-based resin film can be stretched. Examples thereof may include a method of uniaxially stretching a propylene-based resin film at a predetermined temperature using a uniaxial stretching device.

[First Annealing Step]

Next, the first annealing step of annealing the propylene-based resin film after the first stretching step is performed. The first annealing step is performed to relax the residual strain in the propylene-based resin film caused by stretching in the stretching step. This can suppress the occurrence of thermal shrinkage of the obtained propylene-based resin microporous film.

In the first annealing step, the surface temperature of the propylene-based resin film is preferably equal to or higher than the surface temperature of the propylene-based resin film in the first stretching step and equal to or lower than a temperature lower than the melting point of the propylene-based resin by 10° C. When the surface temperature is low, the strain remained in the propylene-based resin film is not sufficiently relaxed. When the surface temperature is high, the micropores formed in the first stretching step may be blocked.

In the first annealing step, it is preferable that the surface temperature of the propylene-based resin film be equal to or higher than the surface temperature of the propylene-based resin film in the first stretching step. When the first stretching steps (A) and (B) are performed, it is preferable that the surface temperature of the propylene-based resin film in the first annealing step be equal to or higher than the surface temperature of the propylene-based resin film in the first stretching step (B).

The shrinkage ratio of the propylene-based resin film in the first annealing step is preferably 30% or less. When the shrinkage ratio is high, the propylene-based resin film may sag, and not be uniformly annealed, or the shape of the micropores may not be maintained.

The shrinkage ratio of the propylene-based resin film in the first annealing step represents a value obtained by dividing the length of shrinkage of the propylene-based resin film in the stretching direction of the first stretching step in the first annealing step by the length of the propylene-based resin film in the stretching direction after the first stretching step (after the first stretching step (B) when the first stretching steps (A) and (B) are performed) and multiplying the resultant by 100.

According to the method of the present invention, in the first stretching step, the propylene-based resin film can be uniaxially stretched only in one direction of the extrusion direction and the width direction to produce a propylene-based resin microporous film. Further, according to the method of the present invention, the propylene-based resin film can be biaxially stretched to produce a propylene-based resin microporous film. For example, the propylene-based resin film is stretched in one direction in the first stretching step, and then subjected to the first annealing step. Subsequently, in a second stretching step, the propylene-based resin film is stretched in a direction intersecting the stretching direction in the first stretching step. Thus, a propylene-based resin microporous film can be produced. In particular, it is preferable that the propylene-based resin film be stretched in the extrusion direction in the first stretching step, subjected to the first annealing step, and then stretched in the width direction in the second stretching step, to produce a propylene-based resin microporous film.

[Second Stretching Step]

In the method of the present invention, it is preferable to perform a second stretching step wherein the propylene-based resin film after the first annealing step be stretched in the width direction at a surface temperature thereof equal to or higher than a temperature lower than the melting point of the propylene-based resin by 60° C. and equal to or lower than the surface temperature of the propylene-based resin film in the first annealing step and a stretching ratio of 1.05 to 3 times.

When the propylene-based resin film is further stretched in the width direction in the second stretching step, the apertures of the micropores in the propylene-based resin film surface are slightly blocked to decrease the aperture area of the micropores. In addition, the micropores in the propylene-based resin film can be grown in the width direction. Therefore, the surface aperture ratio of the propylene-based resin film can be decreased and the porosity can be increased in the second stretching step. As a result, a propylene-based resin microporous film having a low ratio (A/P) of the surface aperture ratio (A) to the porosity (P) and excellent gas permeability can be obtained.

Further, when the propylene-based resin film is stretched in the width direction in the second stretching step, the electrolyte solution permeability in both the extrusion direction and the width direction of the obtained propylene-based resin microporous film can be improved. Thus, a propylene-based resin microporous film which can allow a large amount of electrolyte solution to permeate thereinto in a short time can be obtained.

In the second stretching step, the surface temperature of the propylene-based resin film is preferably a temperature that is equal to or higher than a temperature lower than the melting point of the propylene-based resin by 60° C. and equal to or lower than the surface temperature of the propylene-based resin film in the first annealing step, and more preferably a temperature that is equal to or higher than a temperature lower the melting point of the propylene-based resin by 50° C. and equal to or lower than the surface temperature of the propylene-based resin film in the first annealing step. When the surface temperature is low, the electrolyte solution permeability in both the extrusion direction and the width direction of the propylene-based resin microporous film may not be improved sufficiently. When the surface temperature is high, the formed micropores may be blocked. For this reason, the gas permeability of the propylene-based resin microporous film may deteriorate.

In the second stretching step, the stretching ratio of the propylene-based resin film is preferably 1.05 to 3 times, and more preferably 1.1 to 2.5 times. When the stretching ratio is low, the electrolyte solution permeability in both the extrusion direction and the width direction of the propylene-based resin microporous film may not be improved sufficiently. When the stretching ratio is high, the micropores formed in the first stretching step are blocked, and the gas permeability of the propylene-based resin microporous film may deteriorate.

In the second stretching step, the stretching rate of the propylene-based resin film is preferably 400%/min or less, more preferably 100%/min or less, and particularly preferably 50%/min or less. When the stretching rate is high, the micropores are unlikely to be grown in the width direction. In contrast, when the stretching rate is low, the micropores are unlikely to be uniformly grown in the width direction. Therefore, the stretching rate of the propylene-based resin film in the second stretching step is preferably 15%/min or more.

A method of stretching the propylene-based resin film in the second stretching step is not particularly limited as long as the propylene-based resin film can be stretched only in the width direction. For example, the propylene-based resin film can be stretched at a predetermined temperature using a uniaxial stretching device.

[Second Annealing Step]

It is preferable to perform a second annealing step wherein the propylene-based resin film after the second stretching step be annealed at a surface temperature equal to or higher than the surface temperature of the propylene-based resin film in the second stretching step and equal to or lower than a temperature lower than the melting point of the propylene-based resin by 10° C.

The second annealing step is performed to relax the residual strain in the propylene-based resin film caused by stretching in the second stretching step. Thus, the occurrence of thermal shrinkage in the propylene-based resin microporous film can be suppressed.

In the second annealing step, the surface temperature of the propylene-based resin film is preferably a temperature that is equal to or higher than the surface temperature of the propylene-based resin film in the second stretching step and equal to or lower than a temperature lower than the melting point of the propylene-based resin by 10° C. When the surface temperature is low, the strain remained in the propylene-based resin film is not sufficiently relaxed. Therefore, the dimensional stability under heat of the propylene-based resin microporous film may deteriorate. When the surface temperature is high, the micropores formed in the stretching step may be blocked.

The shrinkage ratio of the propylene-based resin film in the second annealing step is preferably 30% or less. When the shrinkage ratio is high, the propylene-based resin film may sag, and not be uniformly annealed, or the shape of the micropores may not be maintained.

The shrinkage ratio of the propylene-based resin film in the second annealing step represents a value obtained by dividing the length of shrinkage of the propylene-based resin film in the stretching direction of the second stretching step in the second annealing step by the length of the propylene-based resin film in the stretching direction of the second stretching step after the second stretching step and multiplying the resultant by 100.

Advantageous Effects of Invention

Since the propylene-based resin microporous film of the present invention is configured as described above, the propylene-based resin microporous film has excellent solution retention property. For example, when the propylene-based resin microporous film is used for a lithium ion battery, the lithium ion battery in which a sufficient amount of electrolyte solution can be contained and a decrease in discharge capacity caused by liquid shortage due to charge and discharge is highly reduced can be configured. In such a lithium ion battery, the cycle life characteristics are excellent and the power generating performance can be stably maintained over an extended period of time.

According to the method for producing a propylene-based resin microporous film of the present invention, the above-described propylene-based resin microporous film can be produced easily.

Further, the propylene-based resin microporous film having micropores formed by stretching the propylene-based resin film in the extrusion direction and the width direction has not only the high electrolyte solution retention property, but also the high electrolyte solution permeability. Thus, the micropores can allow a large amount of electrolyte solution to permeate thereinside in a short time. Therefore, such a propylene-based resin microporous film can allow the electrolyte solution to easily permeate in a short time during assembly of a battery, and thus the productivity of a lithium ion battery can be improved.

DESCRIPTION OF EMBODIMENTS

Hereinafter, Examples of the present invention will be described. The present invention is not limited to Examples.

Examples 1 to 6 and Comparative Examples 1 to 4

(Extrusion Step)

A homopolypropylene having the weight average molecular weight, the number average molecular weight, the melting point, and the pentad fraction, shown in Table 1, was supplied to an extruder, melt-kneaded at a resin temperature of 200° C., and extruded through a T-die attached to the tip of the extruder into a film, to obtain an elongated homopolypropylene film. The homopolypropylene film was then cooled to a surface temperature of 30° C. The thickness of the homopolypropylene film was 30 μm and the width thereof was 200 mm. The extruded rate was 10 kg/hr., the film-forming rate was 22 m/min., and the draw ratio was 83.

(Aging Step)

The resulting elongated homopolypropylene film having a length of 50 m was wound around a cylindrical core having an outer diameter of 3 inches into a roll, to obtain a homopolypropylene film roll. The homopolypropylene film roll was allowed to stand in a hot blast furnace at a temperature under an atmosphere where the homopolypropylene film roll was placed of 150° C. over 24 hours, and the homopolypropylene film was aged. At this time, the overall temperature of the homopolypropylene film from the surface to the inside of the homopolypropylene film roll was the same as the temperature in the hot blast furnace.

(First Stretching Step (A))

Next, the homopolypropylene film was unwound from the aged homopolypropylene film roll, and cut into a strip shape of 300 mm in the extrusion direction (longitudinal direction) and 160 mm in the width direction. The cut homopolypropylene film was uniaxially stretched at a surface temperature of 23° C., a stretching rate of 50%/min, and a stretching ratio shown in a column of first stretching step (A) of Table 1, only in the extrusion direction using a uniaxial stretching device ("IMC-18C6" manufactured by Imoto Machinery Co., Ltd.).

(First Stretching Step (B))

Subsequently, the homopolypropylene film was uniaxially stretched at a surface temperature of 120° C., a stretching rate of 42%/min, a stretching ratio shown in a column of first stretching step (B) of Table 1, only in the extrusion direction using the uniaxial stretching device ("IMC-18C6" manufactured by Imoto Machinery Co., Ltd.).

(First Annealing Step)

After that, the homopolypropylene film was allowed to stand over 10 minutes at a surface temperature of 130° C. so that a tension was not applied to the homopolypropylene film, and thus annealed to obtain a homopropylene microporous film having a thickness of 25 μm. The shrinkage ratio of the homopolypropylene film in the first annealing step was 20%.

Examples 7 to 12 and Comparative Examples 5 to 9

(Extrusion Step)

A homopolypropylene having the weight average molecular weight, the number average molecular weight, the melting point, and the pentad fraction, shown in Table 2, was supplied to an extruder, melt-kneaded at a resin temperature of 200° C., and extruded through a T die attached to the tip of the extruder into a film, to obtain an elongated homopolypropylene film. The homopolypropylene film was then cooled to a surface temperature of 30° C. The thickness of the homopolypropylene film was 30 μm and the width thereof was 200 mm. The extruded rate was 10 kg/hr., the film-forming rate was 22 m/min., and the draw ratio was 83.

(Aging Step)

The resulting elongated homopolypropylene film having a length of 50 m was wound around a cylindrical core having an outer diameter of 3 inches into a roll, to obtain a homopolypropylene film roll. The homopolypropylene film roll was allowed to stand in a hot blast furnace at a temperature under an atmosphere where the homopolypropylene film roll was placed of 150° C. over 24 hours, and the homopolypropylene film was aged. At this time, the overall temperature of the homopolypropylene film from the surface to the inside of the homopolypropylene film roll was entirely the same as the temperature in the hot blast furnace.

(First Stretching Step (A))

Next, the homopolypropylene film was unwound from the aged homopolypropylene film roll, and cut into a strip shape of 300 mm in the extrusion direction (longitudinal direction) and 160 mm in the width direction. The cut homopolypropylene film was stretched at a surface temperature of 23° C., stretching rate of 50%/min, and a stretching ratio shown in a column of first stretching step (A) of Table 2, only in the extrusion direction using a uniaxial stretching device ("IMC-18C6" manufactured by Imoto Machinery Co., Ltd.).

(First Stretching Step (B))

Subsequently, the homopolypropylene film was stretched at a surface temperature of 120° C., a stretching rate of 42%/min, a stretching ratio shown in a column of first stretching step (B) of Table 2, only in the extrusion direction using the uniaxial stretching device ("IMC-18C6" manufactured by Imoto Machinery Co., Ltd.).

(First Annealing Step)

After that, the homopolypropylene film was allowed to stand over 10 minutes at a surface temperature of 130° C. so that a tension was not applied to the homopolypropylene film, and thus annealed. The shrinkage ratio of the homopolypropylene film in the first annealing step was 20%.

(Second Stretching Step)

Subsequently, the homopolypropylene film was hot-stretched at a surface temperature of 120° C., a stretching rate of 42%/min, and a stretching ratio of 1.2 times in the width direction (direction perpendicular to the extrusion direction) using the uniaxial stretching device ("IMC-18C6" manufactured by Imoto Machinery Co., Ltd.). As a result, a homopolypropylene film biaxially stretched was obtained.

(Second Annealing Step)

After that, the homopolypropylene film was allowed to stand over 10 minutes at a surface temperature of 130° C. so that a tension was not applied to the homopolypropylene film, and thus annealed to obtain a homopropylene microporous film having a thickness of 23 μm. The shrinkage ratio of the homopolypropylene film in the second annealing step was 20%.

[Evaluation 1]

The surface aperture ratio, the porosity, the degree of gas permeability, the longest diameter and the average longer diameter of aperture edges of the micropores, and the electrolyte solution retention amount of the homopolypropylene microporous films obtained in Examples and Comparative Examples were measured by the above-discussed procedures. The results are shown in Tables 1 and 2.

[Evaluation 2]

Further, the electrolyte solution permeability (in the extrusion direction and the width direction) of the homopolypropylene microporous films obtained in Examples and Comparative Examples were measured as described below. The results are shown in Tables 1 and 2.

A homopolypropylene microporous film was first cut to obtain a specimen having a plane rectangle with a width of 10 mm and a length of 120 mm. At this time, the extrusion direction (longitudinal direction) of the homopolypropylene microporous film was set to the longitudinal direction of the specimen. Subsequently, an end portion of the specimen in the longitudinal direction was fixed to a stainless plate with an adhesive tape. After that, the specimen was disposed so that the longitudinal direction thereof was perpendicular to the water surface of the electrolyte solution, and the other end portion of the specimen in the longitudinal direction was sunk into the electrolyte solution over 10 minutes. At this time, the highest height (mm) at which the electrolyte solution rose in the longitudinal direction of the specimen from the water surface was measured. As the electrolyte solution, an electrolyte solution containing 1 mol/L of $LiPF_6$ in an organic solvent containing ethylene carbonate (EC) and diethyl carbonate (DEC) (EC:DEC (by volume)=1:1) was used. By the same procedure as described above, five specimens were prepared from the homopolypropylene microporous film. The highest heights (mm) at which the electrolyte solution rose in the longitudinal direction of the specimens from the water surface were measured, and the arithmetic average thereof was considered as the electrolyte solution permeability in the extrusion direction of the homopolypropylene microporous film.

The electrolyte solution permeability in the width direction of the homopolypropylene microporous film was measured in the same manner as described above except that when the homopolypropylene microporous film was cut into a plane rectangle with a width of 10 mm and a length of 120 mm to obtain a specimen, the width direction (direction perpendicular to the extrusion direction) of the homopolypropylene microporous film was set to the longitudinal direction of the specimen.

[Evaluation 3]

A lithium ion battery was produced using each of the homopolypropylene microporous films in Examples and Comparative Examples as a separator in accordance with the following procedure. The discharge capacity of the lithium ion battery was measured. The results are shown in Tables 1 and 2.

(Production of Lithium Ion Battery)

92% by weight of $LiMn_2O_4$ (average particle diameter: 26 μm) as a positive electrode active material, 4% by weight of carbon black as a conductive auxiliary agent, and 4% by weight of poly(vinylidene fluoride) as a binder resin were mixed and stirred to prepare a composition for formation of a positive electrode. The composition for formation of a positive electrode was applied to a surface of an aluminum foil as a positive electrode collector using a coater, and then dried, to prepare a positive electrode active material layer. After that, the positive electrode collector having the positive electrode active material layer on the surface was punched to obtain a positive electrode. The positive electrode had a plane rectangle with a width of 30 mm and a length of 60 mm.

Next, 91% by weight of graphite particles as a negative electrode active material, 5% by weight of carbon black as a conductive auxiliary agent, and 4% by weight of poly (vinylidene fluoride) as a binder resin were mixed and stirred to prepare a composition for formation of a negative electrode. As a negative electrode collector, an electrolytic copper foil of which a surface was roughened by an electrolysis method was prepared. The composition for formation of a negative electrode was applied to the roughened surface of the electrolytic copper foil using a coater, and then dried, to prepare a negative electrode active material layer. After that, the negative electrode collector having the negative electrode active material layer on the surface was punched to obtain a negative electrode. The negative electrode had a plane rectangle with a width of 30 mm and a length of 60 mm.

The positive electrode, the homopolypropylene microporous film, and the negative electrode were overlaid so that the positive electrode active material layer and the negative electrode active material layer were opposite to each other with the homopolypropylene microporous film interposed therebetween, to form a layered body. A tab was disposed on each of the positive electrode and the negative electrode, and the layered body was dried under reduced pressure at 80° C. over 12 hours. The layered body dried under reduced pressure was put in an exterior case. Subsequently, an electrolyte solution was poured into the exterior case under an argon gas atmosphere, and the exterior case was sealed under reduced pressure, to produce a lithium ion battery. As the electrolyte solution, an electrolyte solution containing 1 mol/L of $LiPF_6$ in a mixed solution obtained by mixing ethylene carbonate and ethylmethyl carbonate at 3:7 (by volume) was used.

(Discharge Capacity)

The lithium ion battery was placed in a constant temperature bath at 25° C., and charged and discharged as follows. The lithium ion battery was charged to a voltage of 4.1 V at a current corresponding to 0.2 C, and then discharged to a voltage of 2.7 V at a current corresponding to 1 C. The lithium ion battery was then charged to a voltage of 4.1 V at a current corresponding to 1 C, and discharged to a voltage of 2.7 V at a current corresponding to 1 C. After the charge and discharge, the initial discharge capacity $A_1$ (mAh) of the lithium ion battery was measured. After that, the lithium ion battery was charged to a voltage of 4.1 V at a current corresponding to 1 C, and discharged to a voltage of 2.7 V at a current corresponding to 1 C. The charge and discharge under the above condition was considered as 1 cycle. 500 Cycles of charge and discharge were carried out under the same conditions. The discharge capacity $A_{500}$ (mAh) of the lithium ion battery after 500 cycles of charge and discharge was measured. The retention ratio $((\%)=A_{500}/A_1\times100)$ of the discharge capacity to the initial discharge capacity $A_1$ was calculated.

TABLE 1

| | | EXAMPLE 1 | EXAMPLE 2 | EXAMPLE 3 | EXAMPLE 4 | EXAMPLE 5 |
|---|---|---|---|---|---|---|
| HOMOPOLY-PROPYLENE | WEIGHT AVERAGE MOLECULAR WEIGHT (Mw) | 427000 | 371000 | 371000 | 427000 | 390000 |
| | NUMBER AVERAGE MOLECULAR WEIGHT (Mn) | 45100 | 43200 | 43200 | 45100 | 48800 |
| | MOLECULAR WEIGHT DISTRIBUTION (Mw/Mn) | 9.5 | 8.6 | 8.6 | 9.5 | 8.0 |
| | MELTING POINT (° C.) | 165 | 165 | 165 | 165 | 165 |
| | PENTAD FRACTION (%) | 96 | 98 | 97 | 96 | 96 |
| FIRST STRETCHING STEP (A) | STRETCHING RATIO (TIME) | 1.2 | 1.2 | 1.3 | 1.2 | 1.2 |
| FIRST STRETCHING STEP (B) | STRETCHING RATIO (TIME) | 2.0 | 2.0 | 2.2 | 1.7 | 2.0 |
| HOMOPOLY-PROPYLENE MICROPOROUS FILM | SURFACE APERTURE RATIO (%) | 30 | 31 | 32 | 27 | 28 |
| | POROSITY (%) | 53 | 52 | 54 | 46 | 48 |
| | RATIO (SURFACE APERTURE RATIO/POROSITY) | 0.57 | 0.59 | 0.59 | 0.59 | 0.58 |
| | DEGREE OF GAS PERMEABILITY (s/100 mL) | 160 | 164 | 100 | 400 | 190 |
| | LONGEST DIAMETER (nm) | 430 | 440 | 530 | 350 | 380 |
| | AVERAGE LONGER DIAMETER (nm) | 220 | 230 | 320 | 190 | 200 |
| | ELECTROLYTE SOLUTION RETENTION AMOUNT (g/cm$^3$) | 0.98 | 1.10 | 1.05 | 0.98 | 0.98 |
| | ELECTROLYTE SOLUTION PERMEABILITY (mm) IN EXTRUSION DIRECTION | 29 | 29 | 30 | 28 | 28 |
| | ELECTROLYTE SOLUTION PERMEABILITY (mm) IN WIDTH DIRECTION | 49 | 48 | 50 | 47 | 48 |
| LITHIUM ION BATTERY | INITIAL DISCHARGE CAPACITY $A_1$ (mAh) | 60 | 60 | 59 | 59 | 60 |
| | DISCHARGE CAPACITY $A_{500}$ (mAh) AFTER 500 CYCLES | 50 | 51 | 51 | 49 | 50 |
| | RETENTION RATIO (%) OF DISCHARGE CAPACITY AFTER 500 CYCLES | 83 | 85 | 86 | 83 | 83 |

| | | EXAMPLE 6 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| HOMOPOLY-PROPYLENE | WEIGHT AVERAGE MOLECULAR WEIGHT (Mw) | 400000 | 376000 | 375000 | 330000 | 428000 |
| | NUMBER AVERAGE MOLECULAR WEIGHT (Mn) | 39400 | 57300 | 62300 | 49900 | 101000 |
| | MOLECULAR WEIGHT DISTRIBUTION (Mw/Mn) | 10.2 | 6.6 | 6.0 | 6.6 | 4.3 |
| | MELTING POINT (° C.) | 164 | 165 | 165 | 161 | 165 |
| | PENTAD FRACTION (%) | 97 | 92 | 94 | 93 | 92 |
| FIRST STRETCHING STEP (A) | STRETCHING RATIO (TIME) | 1.2 | 1.2 | 1.2 | 1.2 | 1.2 |
| FIRST STRETCHING STEP (B) | STRETCHING RATIO (TIME) | 2.0 | 2.0 | 2.0 | 2.0 | 2.0 |
| HOMOPOLY-PROPYLENE MICROPOROUS FILM | SURFACE APERTURE RATIO (%) | 31 | 26 | 26 | 26 | 13 |
| | POROSITY (%) | 53 | 41 | 42 | 54 | 45 |
| | RATIO (SURFACE APERTURE RATIO/POROSITY) | 0.58 | 0.63 | 0.62 | 0.48 | 0.29 |
| | DEGREE OF GAS PERMEABILITY (s/100 mL) | 150 | 210 | 190 | 200 | 600 |
| | LONGEST DIAMETER (nm) | 400 | 350 | 550 | 1020 | 300 |
| | AVERAGE LONGER DIAMETER (nm) | 220 | 210 | 270 | 550 | 140 |
| | ELECTROLYTE SOLUTION RETENTION AMOUNT (g/cm$^3$) | 1.00 | 0.67 | 0.60 | 0.91 | 0.52 |
| | ELECTROLYTE SOLUTION PERMEABILITY (mm) IN EXTRUSION DIRECTION | 29 | 25 | 29 | 29 | 20 |
| | ELECTROLYTE SOLUTION PERMEABILITY (mm) IN WIDTH DIRECTION | 50 | 42 | 40 | 50 | 34 |

TABLE 1-continued

| | | | | | | |
|---|---|---|---|---|---|---|
| LITHIUM ION BATTERY | INITIAL DISCHARGE CAPACITY $A_1$ (mAh) | 60 | 58 | 59 | 60 | 60 |
| | DISCHARGE CAPACITY $A_{500}$ (mAh) AFTER 500 CYCLES | 51 | 44 | 44 | 45 | 42 |
| | RETENTION RATIO (%) OF DISCHARGE CAPACITY AFTER 500 CYCLES | 85 | 76 | 75 | 75 | 70 |

TABLE 2

| | | EXAMPLE 7 | EXAMPLE 8 | EXAMPLE 9 | EXAMPLE 10 | EXAMPLE 11 | EXAMPLE 12 |
|---|---|---|---|---|---|---|---|
| HOMOPOLY-PROPYLENE | WEIGHT AVERAGE MOLECULAR WEIGHT (Mw) | 427000 | 371000 | 371000 | 427000 | 390000 | 400000 |
| | NUMBER AVERAGE MOLECULAR WEIGHT (Mn) | 45100 | 43200 | 43200 | 45100 | 48800 | 39400 |
| | MOLECULAR WEIGHT DISTRIBUTION (Mw/Mn) | 9.5 | 8.6 | 8.6 | 9.5 | 8.0 | 10.2 |
| | MELTING POINT (° C.) | 165 | 165 | 165 | 165 | 165 | 164 |
| | PENTAD FRACTION (%) | 96 | 98 | 97 | 96 | 96 | 97 |
| FIRST STRETCHING STEP (A) | STRETCHING RATIO (TIME) | 1.2 | 1.2 | 1.3 | 1.2 | 1.2 | 1.2 |
| FIRST STRETCHING STEP (B) | STRETCHING RATIO (TIME) | 2.0 | 2.0 | 2.2 | 1.7 | 2.0 | 2.0 |
| HOMOPOLY-PROPYLENE MICROPOROUS FILM | SURFACE APERTURE RATIO (%) | 28 | 28 | 30 | 27 | 28 | 29 |
| | POROSITY (%) | 55 | 54 | 56 | 54 | 54 | 55 |
| | RATIO (SURFACE APERTURE RATIO/POROSITY) | 0.51 | 0.52 | 0.53 | 0.5 | 0.52 | 0.53 |
| | DEGREE OF GAS PERMEABILITY (s/100 mL) | 100 | 110 | 60 | 200 | 120 | 110 |
| | LONGEST DIAMETER (nm) | 420 | 435 | 480 | 330 | 360 | 370 |
| | AVERAGE LONGER DIAMETER (nm) | 210 | 220 | 290 | 180 | 190 | 200 |
| | ELECTROLYTE SOLUTION RETENTION AMOUNT (g/cm³) | 1.17 | 1.20 | 1.21 | 1.15 | 1.20 | 1.22 |
| | ELECTROLYTE SOLUTION PERMEABILITY (mm) IN EXTRUSION DIRECTION | 37 | 36 | 37 | 35 | 35 | 36 |
| | ELECTROLYTE SOLUTION PERMEABILITY (mm) IN WIDTH DIRECTION | 50 | 50 | 50 | 48 | 50 | 51 |
| LITHIUM ION BATTERY | INITIAL DISCHARGE CAPACITY $A_1$ (mAh) | 60 | 60 | 60 | 60 | 60 | 60 |
| | DISCHARGE CAPACITY $A_{500}$ (mAh) AFTER 500 CYCLES | 52 | 53 | 53 | 51 | 52 | 52 |
| | RETENTION RATIO (%) OF DISCHARGE CAPACITY AFTER 500 CYCLES | 87 | 88 | 88 | 85 | 87 | 87 |

| | | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|
| HOMOPOLY-PROPYLENE | WEIGHT AVERAGE MOLECULAR WEIGHT (Mw) | 375000 | 330000 | 428000 | 146000 | 587000 |
| | NUMBER AVERAGE MOLECULAR WEIGHT (Mn) | 62300 | 49900 | 101000 | 51100 | 76600 |
| | MOLECULAR WEIGHT DISTRIBUTION (Mw/Mn) | 6 | 6.6 | 4.3 | 2.9 | 7.7 |
| | MELTING POINT (° C.) | 165 | 161 | 165 | 163 | 162 |
| | PENTAD FRACTION (%) | 94 | 93 | 92 | 96 | 96 |
| FIRST STRETCHING STEP (A) | STRETCHING RATIO (TIME) | 1.2 | 1.2 | 1.2 | 1.2 | 1.2 |
| FIRST STRETCHING STEP (B) | STRETCHING RATIO (TIME) | 2.0 | 2.0 | 2.0 | 2.0 | 2.0 |
| HOMOPOLY-PROPYLENE MICROPOROUS FILM | SURFACE APERTURE RATIO (%) | 26 | 25 | 14 | 9 | 9 |
| | POROSITY (%) | 43 | 55 | 46 | 32 | 30 |
| | RATIO (SURFACE APERTURE RATIO/POROSITY) | 0.6 | 0.45 | 0.3 | 0.28 | 0.3 |

TABLE 2-continued

|  |  |  |  |  |  |  |
|---|---|---|---|---|---|---|
|  | DEGREE OF GAS PERMEABILITY (s/100 mL) | 160 | 180 | 540 | 1800 | 2100 |
|  | LONGEST DIAMETER (nm) | 510 | 990 | 290 | 420 | 200 |
|  | AVERAGE LONGER DIAMETER (nm) | 240 | 520 | 130 | 110 | 85 |
|  | ELECTROLYTE SOLUTION RETENTION AMOUNT (g/cm$^3$) | 0.73 | 0.98 | 0.60 | 0.32 | 0.25 |
|  | ELECTROLYTE SOLUTION PERMEABILITY (mm) IN EXTRUSION DIRECTION | 30 | 32 | 23 | 12 | 11 |
|  | ELECTROLYTE SOLUTION PERMEABILITY (mm) IN WIDTH DIRECTION | 42 | 48 | 35 | 13 | 13 |
| LITHIUM ION BATTERY | INITIAL DISCHARGE CAPACITY $A_1$ (mAh) | 59 | 60 | 60 | 52 | 50 |
|  | DISCHARGE CAPACITY $A_{500}$ (mAh) AFTER 500 CYCLES | 45 | 46 | 43 | 5 | 5 |
|  | RETENTION RATIO (%) OF DISCHARGE CAPACITY AFTER 500 CYCLES | 76 | 77 | 72 | 9.6 | 10 |

INDUSTRIAL APPLICABILITY

The propylene-based resin microporous film of the present invention has excellent electrolyte solution retention property. Therefore, the propylene-based resin microporous film is suitably used as a separator for a battery. The propylene-based resin microporous film can provide a battery in which a decrease in discharge capacity due to degradation of an electrolyte solution is highly reduced even after repeated charge and discharge.

The invention claimed is:

1. A propylene-based resin microporous film having micropores, comprising a propylene-based resin having a weight average molecular weight of 250,000 to 500,000, a melting point of 160 to 170° C., and a pentad fraction of 96% or more, and having a surface aperture ratio of 27 to 42%, a ratio of a surface aperture ratio to a porosity of 0.6 or less, a degree of gas permeability of 50 to 400 s/100 mL, and an electrolyte solution retention amount of 0.90 g/cm$^3$ to 1.5 g/cm$^3$.

2. The propylene-based resin microporous film according to claim 1, wherein aperture edges of the micropores have a longest diameter of 100 nm to 1 μm and an average longer diameter of 10 to 500 nm.

3. A separator for a battery, comprising the propylene-based resin microporous film according to claim 1.

4. A battery, comprising the separator for a battery according to claim 3.

5. A propylene-based resin microporous film having micropores, comprising a propylene-based resin having a weight average molecular weight of 250,000 to 500,000, a melting point of 160 to 170° C., a pentad fraction of 96% or more and a molecular weight distribution (weight average molecular weight/number average molecular weight) of 7.5 to 12.0, and having a surface aperture ratio of 27 to 42%, a ratio of a surface aperture ratio to a porosity of 0.6 or less, and a degree of gas permeability of 50 to 400 s/100 mL.

* * * * *